United States Patent
Kim et al.

(10) Patent No.: US 10,142,150 B2
(45) Date of Patent: Nov. 27, 2018

(54) PILOT SIGNAL GENERATING APPARATUS, METHOD THEREOF, AND TRANSMITTING APPARATUS

(71) Applicants: ELECTRONICS AND TELECOMMUNICATIONS RESEARCH INSTITUTE, Daejeon (KR); Kyungpook National University Industry-Academic Cooperation Foundation, Daegu (KR)

(72) Inventors: Young Su Kim, Daejeon (KR); Dong Seog Han, Daegu (KR); Myung Chul Park, Daegu (KR); Hyoung Soo Lim, Daejeon (KR); Nam Ho Hur, Sejong (KR)

(73) Assignees: ELECTRONICS AND TELECOMMUNICATIONS RESEARCH INSTITUTE, Daejeon (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 83 days.

(21) Appl. No.: 15/287,575

(22) Filed: Oct. 6, 2016

(65) Prior Publication Data

US 2017/0126451 A1    May 4, 2017

(30) Foreign Application Priority Data

Oct. 29, 2015 (KR) .................. 10-2015-0151384

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01); *H04L 27/2688* (2013.01)

(58) Field of Classification Search
CPC ............. H04L 27/2613; H04L 27/2688; H04L 5/0048
See application file for complete search history.

(56) References Cited

U.S. PATENT DOCUMENTS

| | | | |
|---|---|---|---|
| 2004/0066839 A1 | 4/2004 | Choi et al. | |
| 2010/0254470 A1 | 10/2010 | Kim et al. | |
| 2015/0098521 A1* | 4/2015 | Beidas | H04B 7/18517 375/296 |
| 2017/0093519 A1* | 3/2017 | Deng | H04J 14/0298 |

(Continued)

OTHER PUBLICATIONS

J.E.Mazo, "Faster-Than-Nyquist Signaling", The Bell System Technical Journal, Oct. 1975, pp. 1451-1462, vol. 54, No. 8, American Telephone an Telegraph Company, U.S.A.

(Continued)

*Primary Examiner* — Kan Yuen (57) ABSTRACT

An exemplary embodiment of the present invention provides a pilot signal generating apparatus, including: a changed amount estimating unit which estimates a changed amount of a pilot symbol due to interference of a data symbol which is adjacent to a predefined position of the pilot symbol; and a symbol generating unit which generates the pilot symbol in consideration of the estimated changed amount.

8 Claims, 7 Drawing Sheets

(56) References Cited

U.S. PATENT DOCUMENTS

2017/0099172 A1* 4/2017 Ren .................. H04L 27/264

OTHER PUBLICATIONS

A. D. Liveris and C. N. Georghiades, "Exploiting Faster-Than-Nyquist Signaling", IEEE Transactions on Communications, Sep. 2003, pp. 1502-1511, vol. 51, No. 9, IEEE, U.S.A.

I. D. Kanaras, "Spectrally Efficient Multicarrier Communication Systems: Signal Detection, Mathematical Modelling and Optimisation", Jun. 2010, Communications and Information Systems Research Group Department of Electronic and Electrical Engineering University College London, UK.

A. Filippi and S. Serbetli, "OFMD Symbol Synchrinization Using Frequency Domain Pilots in Time Domain", IEEE Transactions on Wireless Communications, Jun. 2009, pp. 3420-3248. vol. 8, No. 6, IEEE, U.S.A.

F. Rusek and J. B. Anderson, "The Two Dimensional Mazo Limit", Proc. IEEE Int. Symp. Inf. Theory, Sep. 2005, Adelaide, Australia.

F. Classen and H. Meyr, "Frequency Synchronization Algorithms for OFDM Systems suitable for Communication over Frequency Selective Fading Channels", Proc. Vehicular Technology Conference, Jun. 1994, pp. 1655-1659, Stockholm.

J. Echavarri et al., "A Comparison of Time and Frequency Synchronisation Algorithms for the European DVB-T System", Proc. Vehicular Technology Conference, Sep. 1999, pp. 678-682, Amsterdam.

\* cited by examiner

PILOT SIGNAL GENERATING APPARATUS, METHOD THEREOF, AND TRANSMITTING APPARATUS

CROSS-REFERENCE TO RELATED APPLICATIONS

This application claims priority to and the benefit of Korean Patent Application No. 10-2015-0151384 filed in the Korean Intellectual Property Office on Oct. 29, 2015, the entire contents of which are incorporated herein by reference.

TECHNICAL FIELD

The present invention relates to a pilot signal generating apparatus, a method thereof, and a transmitting apparatus.

BACKGROUND ART

Recently, user's demands on a high quantity and high quality multimedia service are continuously increasing in broadcasting and wireless communication fields. In order to satisfy the demands by a restricted frequency resource, technologies which improve the frequency efficiency as compared with a transmission technology of the related art are necessary. As one of the above-mentioned technologies, a faster than Nyquist (FTN) technique draws attention.

In a transmitting method which is used in a broadcasting and communicating system of the related art, a Nyquist pulse which is designed such that no interference is generated between adjacent transmitting symbols is used. However, according to the FTN technique, the transmitting symbol is transmitted at a cycle which is shorter than that in the related art in order to improve transmission efficiency. Therefore, inter symbol interference is generated between the transmitting symbols.

An amplitude and a phase of a transmitting signal are distorted due to multi-path fading while the transmitting signal passes through a channel, so that the transmitting signal needs to be transmitted by adding the pilot symbol to compensate the distortion in the receiver. Further, the pilot symbol is necessary to synchronize the signals in the receiver.

However, according to the FTN technique, the symbol is transmitted at a shorter cycle than that of the related art. Therefore, data symbols which are adjacent to the pilot symbol affect the pilot symbol so that the pilot symbol is distorted. The above-described distortion causes a problem in that a distorted pilot symbol is transmitted. Further, a distortion degree of the pilot symbol is not constant, but varies depending on a value of the data symbol which is adjacent to the pilot symbol. Therefore, it is difficult to estimate how much the pilot symbol is distorted in the receiver. The receiver performs channel estimating and synchronizing processes under the assumption that a pilot symbol which is not distorted is transmitted, so that the channel estimating and synchronizing performances may be significantly degraded.

SUMMARY OF THE INVENTION

The present invention has been made in an effort to provide a pilot signal generating apparatus, a method thereof, and a transmitting apparatus which may remove distortion of a pilot symbol due to interference.

Technical objects of the present invention are not limited to the aforementioned technical objects and other technical objects which are not mentioned will be apparently appreciated by those skilled in the art from the following description.

An exemplary embodiment of the present invention provides a pilot signal generating apparatus, including: a changed amount estimating unit which estimates a changed amount of a pilot symbol due to interference of a data symbol which is adjacent to a predefined position of the pilot symbol; and a pilot symbol generating unit which generates the pilot symbol in consideration of the estimated changed amount.

In an exemplary embodiment, the changed amount estimating unit may estimate the changed amount due to the interference of the adjacent data symbol in consideration of the number of adjacent data symbols.

In an exemplary embodiment, the pilot symbol generating unit may generate a pilot symbol which is adjusted as much as the estimated changed amount so as to cancel the interference by the adjacent data symbol.

Another exemplary embodiment of the present invention provides a pilot signal generating method, including: estimating a changed amount of a pilot symbol due to interference of a data symbol which is adjacent to a predefined position of the pilot symbol; and generating the pilot symbol in consideration of the estimated changed amount.

Yet another exemplary embodiment of the present invention provides a transmitting apparatus, including: a symbol sequence generating unit which generates a symbol sequence including at least one data symbol; a pilot symbol position determining unit which determines a position of the pilot symbol which is inserted in the symbol sequence; a changed amount estimating unit which estimates a changed amount of a pilot symbol due to interference of a data symbol which is adjacent to a predefined position of the pilot symbol; a pilot symbol generating unit which generates the pilot symbol in consideration of the estimated changed amount; and a transmitting signal generating unit which generates a transmitting symbol by inserting the pilot symbol in the symbol sequence and generates a transmitting signal using the transmitting symbol.

In an exemplary embodiment, the symbol sequence generating unit may generate the symbol sequence by mapping a bit string to the symbol.

In an exemplary embodiment, the pilot symbol position determining unit may determine a position of the pilot symbol in accordance with a predefined rule.

In an exemplary embodiment, the changed amount estimating unit may estimate the changed amount of pilot symbol due to the interference of the adjacent data symbol in consideration of the number of adjacent data symbols.

In an exemplary embodiment, the pilot symbol generating unit may generate a pilot symbol which is distorted as much as the estimated changed amount so as to cancel the interference by the adjacent data symbol.

In an exemplary embodiment, the transmitting signal generating unit may generate the transmitting signal using a faster than Nyquist (FTN) scheme.

In an exemplary embodiment, the transmitting apparatus may further include a frequency converting unit which up-converts a frequency of the transmitting signal.

According to the pilot signal generating apparatus, the method thereof, and the transmitting apparatus according to an exemplary embodiment of the present invention, distortion of a pilot symbol caused by interference of an adjacent data symbol may be removed.

According to the pilot signal generating apparatus, the method thereof, and the transmitting apparatus according to an exemplary embodiment of the present invention, channel estimating and synchronizing performances may be improved.

DETAILED DESCRIPTION

Hereinafter, some exemplary embodiments of the present invention will be described in detail with reference to the accompanying drawings. When reference numerals denote components in the drawings, even though like components are illustrated in different drawings, it should be understood that like reference numerals refer to the same components. In describing the embodiments of the present invention, when it is determined that the detailed description of the known configuration or function related to the present invention may obscure the understanding of exemplary embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature, a sequence or an order of the component is not limited by the terminologies. If not contrarily defined, all terminologies used herein including technological or scientific terms have the same meaning as those generally understood by a person with ordinary skill in the art. Terminologies which are defined in a generally used dictionary should be interpreted to have the same meaning as the meaning in the context of the related art but are not interpreted as ideal or excessively formal meaning if they are not clearly defined in the present invention.

Figure 1:
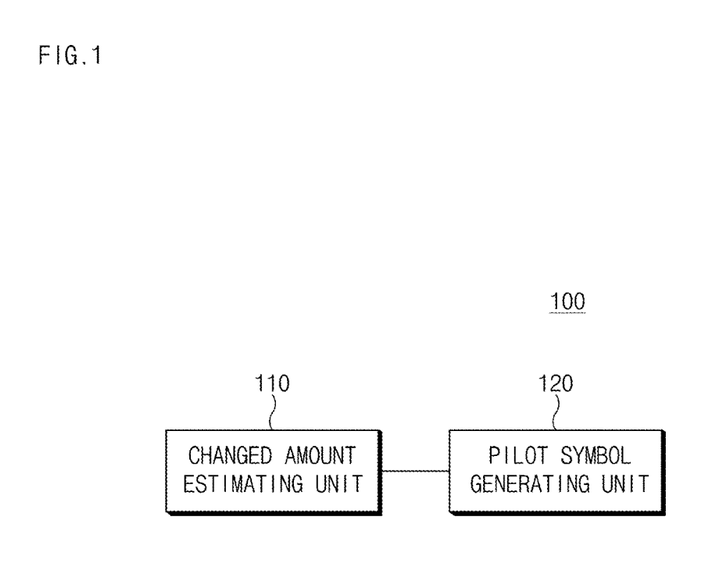
FIG. 1 is a block diagram illustrating a pilot signal generating apparatus according to an exemplary embodiment of the present invention.
Figure 2:
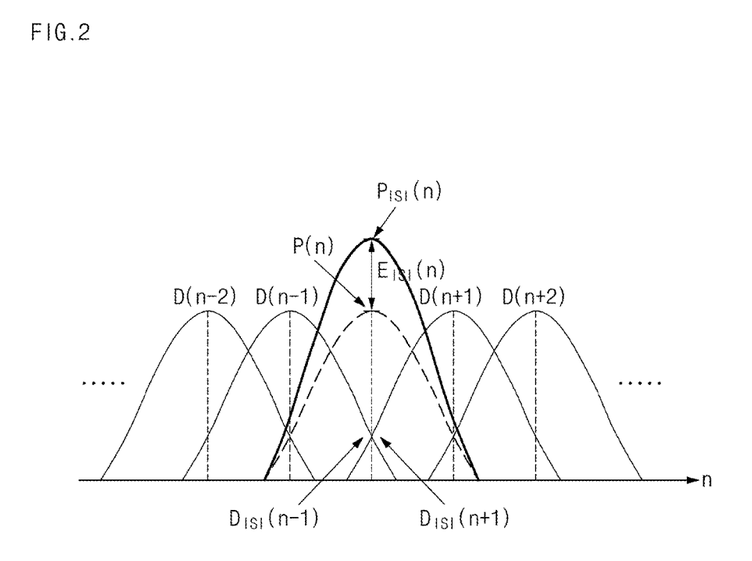
FIGS. 2 and 3 are views explaining an operation of a pilot signal generating apparatus according to an exemplary embodiment of the present invention.
Figure 3:
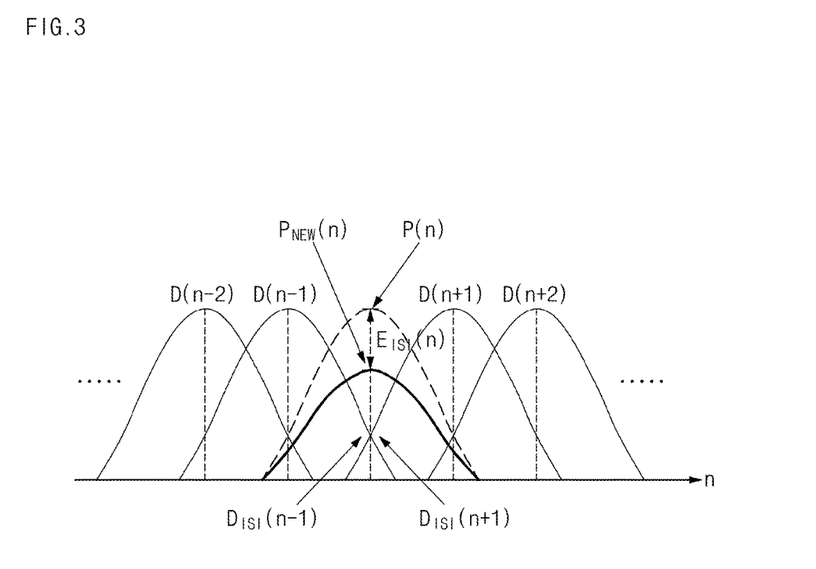

FIG. 1 is a block diagram illustrating a pilot signal generating apparatus according to an exemplary embodiment of the present invention. FIGS. 2 and 3 are views explaining an operation of a pilot signal generating apparatus according to an exemplary embodiment of the present invention.

A pilot signal generating apparatus 100 according to an exemplary embodiment of the present invention estimates a changed amount of a pilot symbol due to interference of an adjacent data symbol and corrects an estimated changed amount in advance to remove distortion of the pilot symbol due to the interference of the adjacent data symbol. The changed amount may be understood as an interference amount or an interference degree of the adjacent data symbol. Hereinafter, it is assumed that a pilot symbol is inserted in a symbol sequence which is transmitted by a faster than Nyquist (FTN) non-orthogonal transmission scheme.

First, referring to FIG. 1, a pilot signal generating apparatus 100 according to an exemplary embodiment of the present invention includes a changed amount estimating unit 110 and a pilot symbol generating unit 120.

The changed amount estimating unit 110 may estimate a changed amount of the pilot symbol caused by the interference of the data symbol which is adjacent to a position of the pilot symbol. For example, the position of the pilot symbol may be determined in advance. The changed amount estimating unit 110 may estimate a changed amount of the pilot symbol in consideration of the number of data symbols which are adjacent to the predefined position of the pilot symbol.

Referring to FIG. 2, an exemplary process of estimating a changed amount of the pilot symbol due to the interference of the adjacent data symbol is illustrated. A quadrature modulation signal such as quadrature amplitude modulation (QAM) includes two types of signal components such as an in-phase component and a quadrature component. In FIG. 2, for the convenience of description, only the in-phase component is illustrated. However, it is obvious that the exemplary embodiment of the present invention may also be applied to the quadrature component.

In the meantime, an FTN signal is a non-orthogonal transmitting scheme, so that there may be interference between symbols. Further, the number of adjacent data symbols which cause the interference may be determined depending on a shape of a pulse which transmits a symbol.

In FIG. 2, a horizontal axis represents a time axis, n indicates a symbol index on the time axis, and a vertical axis represents a amplitude of the symbol. P(n) indicates a pilot symbol, D(n) indicates a data symbol, $E_{ISI}(n)$ indicates a changed amount of the pilot symbol due to interference of the adjacent data symbol, and a $P_{ISI}(n)$ indicates a pilot symbol distorted due to interference of the adjacent data symbol. Further, $D_{ISI}(n-1)$ indicates interference by a data symbol D(n-1) and $D_{ISI}(n+1)$ indicates interference by a data symbol D(n+1). The changed amount $E_{ISI}(n)$ of the pilot symbol P(n) due to the interference of the adjacent data symbol may be represented by the following Equation 1. Hereinafter, in the case of a quadrature modulation signal such as a QAM, it is assumed that the Equation includes both two types of signal components including an in-phase component and a quadrature component.

$$E_{ISI}(n) = \sum_{k=1}^{L} D_{ISI}(n-k) + \sum_{k=1}^{L} D_{ISI}(n+k) \quad \text{[Equation 1]}$$

Here, L is an integer which determines the number of adjacent symbols and may be determined to be large enough to ignore influence of the adjacent data symbol on the pilot symbol.

That is, the pilot symbol P(n) to be originally transmitted is distorted and transmitted due to the interference of the adjacent data symbol as represented in the following Equation 2.

$$P_{ISI}(n) = P(n) + E_{ISI}(n) \quad \text{[Equation 2]}$$

Here, $P_{ISI}(n)$ represents a pilot symbol which is distorted due to the interference of the adjacent data symbol.

Referring to FIGS. 1 and 3, the pilot symbol generating unit 120 may generate a pilot symbol in consideration of a changed amount estimated by the changed amount estimating unit 110. For example, the pilot symbol generating unit 120 may generate a pilot symbol which is distorted (or corrected, adjusted, or controlled) as much as the estimated changed amount so as to cancel the interference by the adjacent data symbol. The pilot symbol generated by the pilot symbol generating unit 120 may be represented by the following Equation 3.

$$P_{NEW}(n) = P(n) - E_{ISI}(n) \qquad \text{[Equation 3]}$$

Here, $P_{NEW}(n)$ may indicate a pilot symbol generated by the pilot symbol generating unit 120.

That is, a changed amount $E_{ISI}(n)$ is subtracted from the pilot symbol generated by the pilot symbol generating unit 120 by the interference of the adjacent data symbol so that the generated pilot symbol may be equal to a pilot symbol to be originally transmitted.

In the meantime, FIG. 3 illustrates that the pilot symbol is corrected in advance as much as the estimated changed amount. However, the exemplary embodiment of the present invention is not limited thereto. Further, in order to reduce a computation amount of the changed amount estimating unit 110, the pilot symbol may be corrected in advance as much as a changed amount which is smaller than or larger than the estimated changed amount.

As described above, the pilot signal generating apparatus 100 according to an exemplary embodiment of the present invention estimates a changed amount due to interference of the data symbol which is adjacent to the predefined position of the pilot symbol and generates a pilot symbol in which the estimated changed amount is corrected in advance to transmit the pilot symbol without being distorted. Therefore, an accuracy of a channel distortion estimation and synchronization in a receiver may be improved.

In the meantime, the pilot signal generating process according to an exemplary embodiment of the present invention has been described with respect to a single carrier scheme, but may also be identically applied to a multi-carrier scheme. In the case of the multi-carrier scheme, the horizontal axis of FIGS. 2 and 3 represents a frequency axis and n represents a sub-carrier index. Further, $P(n)$, $P_{ISI}(n)$, $P_{NEW}(n)$, $D(n)$, $D_{ISI}(n)$, and $E_{ISI}(n)$ indicate sub-carriers. The pilot signal generating process according to an exemplary embodiment of the present invention may also be applied to a scheme obtained by combining the single carrier scheme and a multi-carrier scheme.

Figure 4:
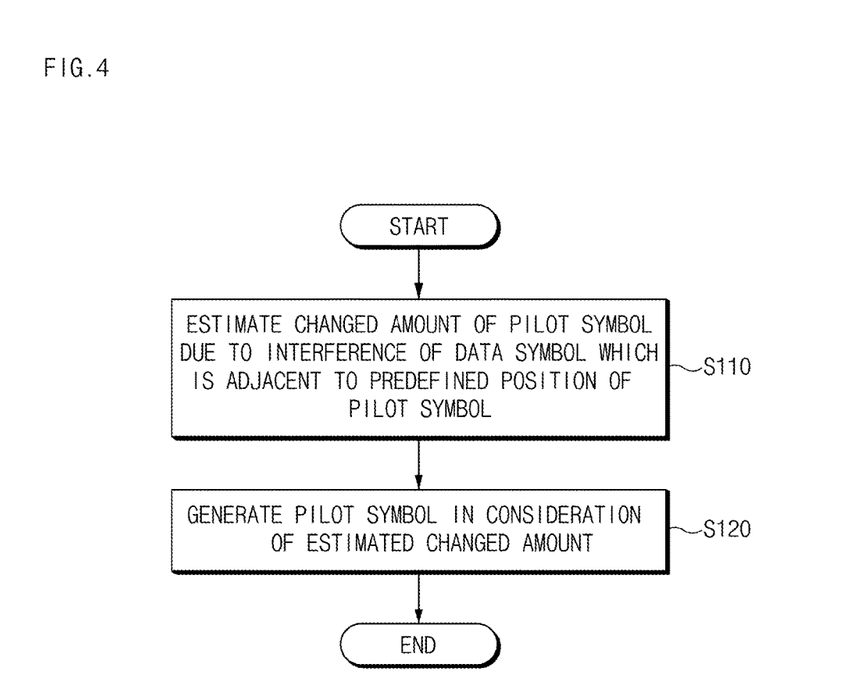
FIG. 4 is a flowchart illustrating a pilot signal generating method according to an exemplary embodiment of the present invention.

FIG. 4 is a flowchart illustrating a pilot signal generating method according to an exemplary embodiment of the present invention.

Referring to FIG. 4, a pilot signal generating method according to an exemplary embodiment of the present invention may include a step S110 of estimating a changed amount of a pilot symbol due to interference of a data symbol which is adjacent to a predefined position of the pilot symbol and a step S120 of generating a pilot symbol in consideration of the estimated changed amount.

Hereinafter, steps S110 and S120 will be described in more detail with reference to FIGS. 1 to 3.

In step S110, the changed amount estimating unit 110 may estimate a changed amount of the pilot symbol caused by the interference of the data symbol which is adjacent to a position of the pilot symbol. For example, the changed amount may be understood to be $E_{ISI}(n)$ which has been described with reference to FIG. 2.

In step S120, the pilot symbol generating unit 120 may generate a pilot symbol in consideration of a changed amount estimated by the changed amount estimating unit 110. For example, the pilot symbol generating unit 120 may generate a pilot symbol which is distorted (or corrected, adjusted, or controlled) as much as the estimated changed amount so as to cancel the interference by the adjacent data symbol. For example, the pilot symbol generated by the pilot symbol generating unit 120 may be understood to be $P_{NEW}(n)$ which has been described with reference to FIG. 3.

Figure 5:
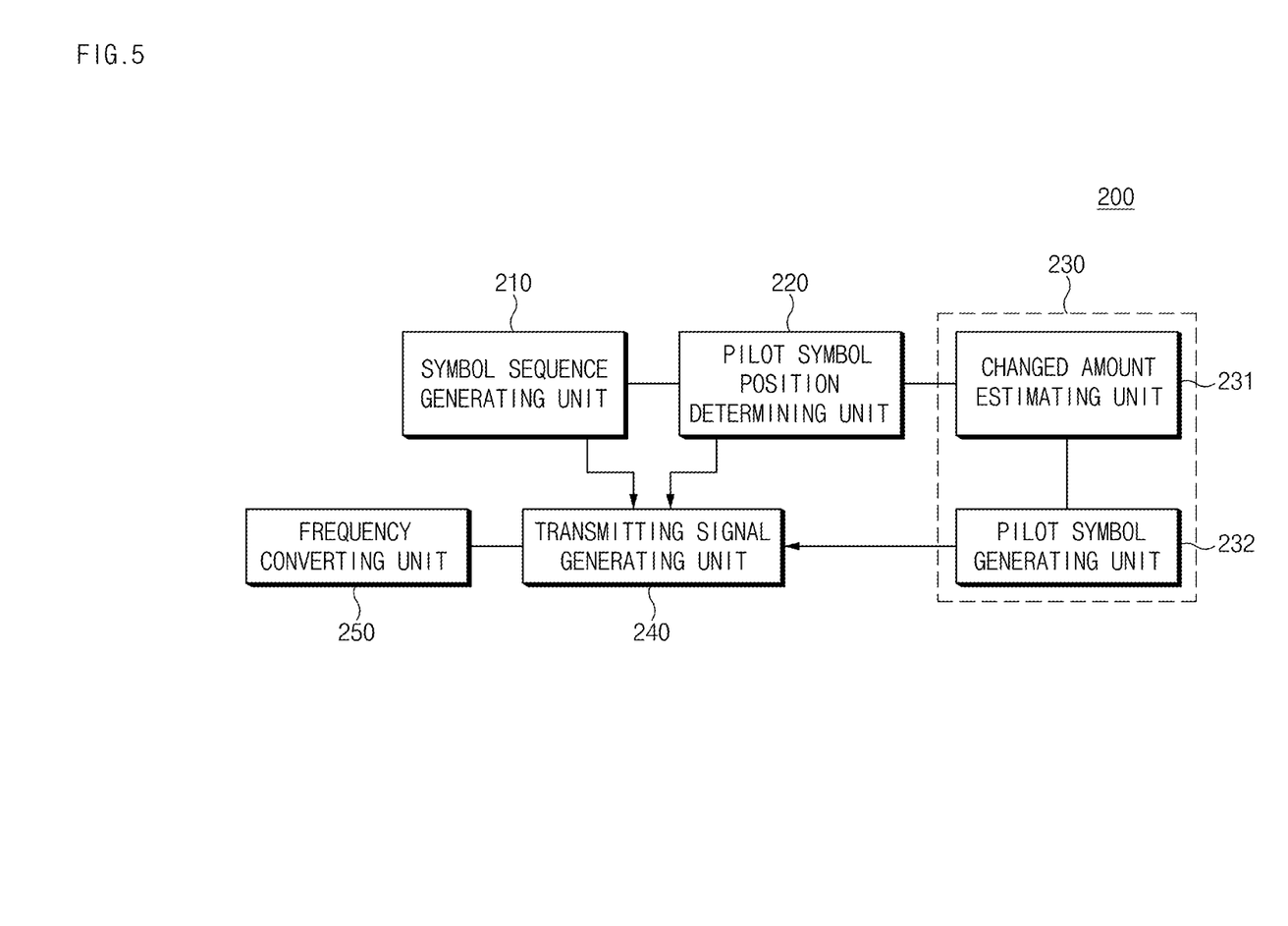
FIG. 5 is a block diagram illustrating a transmitting apparatus according to an exemplary embodiment of the present invention.

FIG. 5 is a block diagram illustrating a transmitting apparatus according to an exemplary embodiment of the present invention.

Referring to FIG. 5, a transmitting device 200 according to an exemplary embodiment of the present invention may include a symbol sequence generating unit 210, a pilot symbol position determining unit 220, a pilot symbol generating device 230, a transmitting signal generating unit 240, and a frequency converting unit 250.

The symbol sequence generating unit 210 may generate a symbol sequence including at least one data symbol. For example, the symbol sequence generating unit 210 maps a bit string to a symbol to generate a symbol sequence.

The pilot symbol position determining unit 220 may determine a position of the symbol sequence into which the pilot symbol is inserted. The pilot symbol position determining unit 220 may determine an insertion position of the pilot symbol in accordance with a predefined rule. For example, in the case of the single carrier system, the pilot symbol position determining unit 220 determines a pilot symbol inserting position at a predetermined interval, along the time axis. In the case of the multi-carrier system, the pilot symbol inserting position may be determined at a predetermined interval on the time axis and the frequency axis. The pilot symbol generating device 230 may include a changed amount estimating unit 231 and a pilot symbol generating unit 232. The changed amount estimating unit 231 may estimate a changed amount of the pilot symbol caused by the interference of the data symbol which is adjacent to the predefined position of the pilot symbol.

The pilot symbol generating unit 232 may generate a pilot symbol in consideration of a changed amount estimated by the changed amount estimating unit 231. For example, the pilot symbol generating unit 232 may generate a pilot symbol which is distorted (or corrected, adjusted, or controlled) as much as the estimated changed amount so as to cancel the interference by the adjacent data symbol.

The transmitting signal generating unit 240 inserts the generated pilot symbol in the predefined position of the symbol sequence to generate a transmitting symbol and generates a transmitting signal using the transmitting symbol. For example, the transmitting signal generating unit 240 may generate a transmitting signal in accordance with a FTN transmitting signal generating method.

The frequency converting unit 250 up-converts the frequency of the transmitting signal generated in the transmitting signal generating unit 240.

As described above, the transmitting apparatus 200 according to an exemplary embodiment of the present invention estimates a changed amount due to interference of the data symbol which is adjacent to the predefined position of the pilot symbol and generates a pilot symbol in which the estimated changed amount is corrected in advance to transmit the pilot symbol without being distorted. Therefore, an accuracy of estimating a channel distortion and synchronization at a receiver may be improved.

Figure 6:
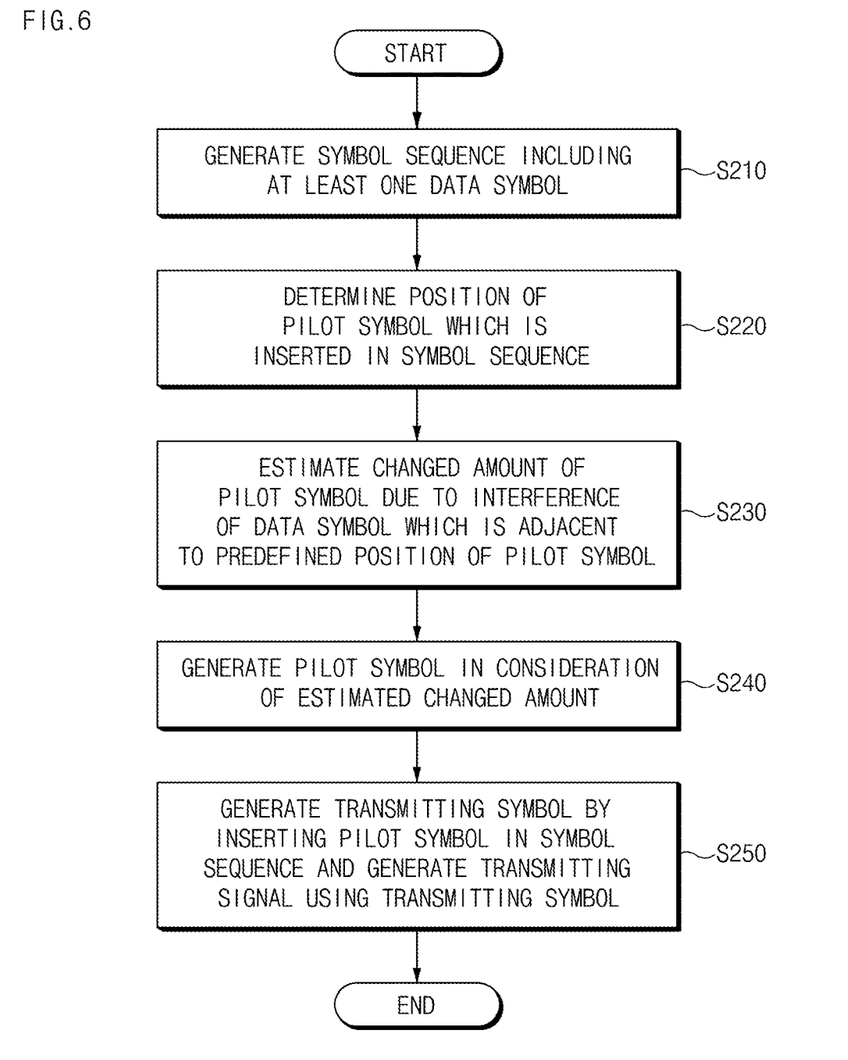
FIG. 6 is a flowchart illustrating a transmitting method according to an exemplary embodiment of the present invention.

FIG. 6 is a flowchart illustrating a transmitting method according to an exemplary embodiment of the present invention.

Referring to FIG. 6, a transmitting method according to an exemplary embodiment of the present invention includes a step S210 of generating a symbol sequence including at least one data symbol, a step S220 of determining a position of a pilot symbol which is inserted in the symbol sequence, a step S230 of estimating a changed amount of the pilot symbol due to interference of a data symbol which is adjacent to the predefined position of the pilot symbol, a step S240 of generating a pilot symbol in consideration of the estimated changed amount, and a step S250 of inserting the pilot symbol in the symbol sequence to generate a transmitting symbol and generating a transmitting signal using the transmitting symbol.

Hereinafter, the above-described steps S210 to S250 will be described in more detail with reference to FIG. 5.

In step S210, the symbol sequence generating unit 210 may generate a symbol sequence including at least one data symbol. For example, the symbol sequence generating unit 210 maps a bit string to a symbol to generate a symbol sequence.

In step S220, the pilot symbol position determining unit 220 may determine a position of the symbol string into which the pilot symbol is inserted. The pilot symbol position determining unit 220 may determine an insertion position of the pilot symbol in accordance with a predefined rule.

In step S230, the changed amount estimating unit 231 may estimate a changed amount of the pilot symbol caused by the interference of the data symbol which is adjacent to the predefined position of the pilot symbol.

In step S240, the pilot symbol generating unit 232 may generate a pilot symbol in consideration of a changed amount estimated by the changed mount estimating unit 231. For example, the pilot symbol generating unit 232 may generate a pilot symbol which is distorted (or corrected, adjusted, or controlled) as much as the estimated changed amount so as to cancel the interference by the adjacent data symbol.

In step S250, the transmitting signal generating unit 240 inserts the generated pilot symbol in the predefined position of the symbol sequence to generate a transmitting symbol and generates a transmitting signal using the transmitting symbol. For example, the transmitting signal generating unit 240 may generate a transmitting signal in accordance with a FTN transmitting signal generating method.

Figure 7:
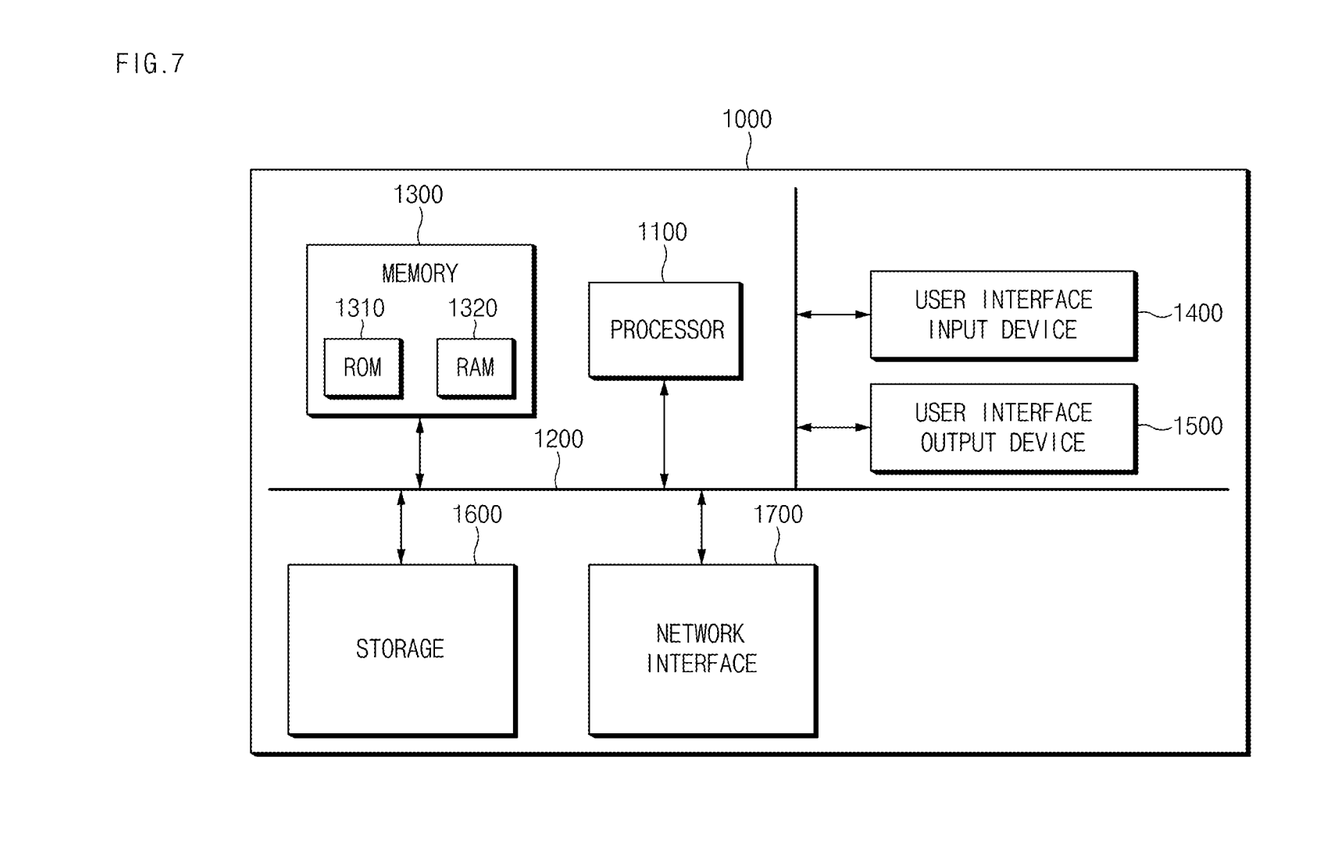
FIG. 7 is a block diagram illustrating a computing system which executes a pilot signal generating method according to an exemplary embodiment of the present invention.

FIG. 7 is a block diagram illustrating a computing system which executes a pilot signal generating method according to an exemplary embodiment of the present invention.

Referring to FIG. 7, a computing system 1000 may include at least one processor 1100, a memory 1300, a user interface input device 1400, a user interface output device 1500, a storage 1600, and a network interface 1700 which are connected to each other through a system bus 1200.

The processor 1100 may be a semiconductor device which performs processings on commands which are stored in a central processing unit (CPU), or the memory 1300 and/or the storage 1600. The memory 1300 and the storage 1600 may include various types of volatile or non-volatile storage media. For example, the memory 1300 may include a read only memory (ROM) and a random access memory (RAM).

The method or a step of algorithm which has been described regarding the exemplary embodiments disclosed in the specification may be directly implemented by hardware or a software module which is executed by a processor 1100 or a combination thereof. The software module may be stored in a storage medium (that is, the memory 1300 and/or the storage 1600) such as a RAM, a flash memory, a ROM, an EPROM, an EEPROM, a register, a hard disk, a detachable disk, or a CD-ROM. An exemplary storage medium is coupled to the processor 1100 and the processor 1100 may read information from the storage medium and write information in the storage medium. As another method, the storage medium may be integrated with the processor 1100. The processor and the storage medium may be stayed in an application specific integrated circuit (ASIC). The ASIC may be stayed in a user terminal. As another method, the processor and the storage medium may be stored in a user terminal as individual components.

It will be appreciated that various exemplary embodiments of the present invention have been described herein for purposes of illustration, and that various modifications, changes, and substitutions may be made by those skilled in the art without departing from the scope and spirit of the present invention.

Therefore, the exemplary embodiments of the present invention are provided for illustrative purposes only but not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A pilot signal generating apparatus, comprising:
   a symbol sequence generating unit which generates a symbol sequence including at least one data symbol;
   a pilot symbol position determining unit which determines a position of a pilot symbol which is inserted in the symbol sequence;
   a changed amount estimating unit which estimates a changed amount of a pilot symbol due to interference of a data symbol which is adjacent to a predefined position of the pilot symbol;
   a pilot symbol generating unit which generates the pilot symbol in consideration of the estimated changed amount, and
   a transmitting signal generating unit which generates a transmitting symbol by inserting the pilot symbol in the symbol sequence and generates a transmitting signal using the transmitting symbol,
   wherein the transmitting signal generating unit generates the transmitting signal using a faster than Nyquist (FTN) scheme,
   wherein the changed amount estimating unit estimates the changed amount due to the interference of the adjacent data symbol in consideration of the number of adjacent data symbols, and
   wherein the changed amount estimating unit estimates the changed amount of the pilot symbol using a sum of changed amounts of the adjacent data symbols corresponding to the number of the adjacent data symbols.

2. The pilot signal generating apparatus of claim 1, wherein the pilot symbol generating unit generates a pilot symbol which is distorted as much as the estimated changed amount so as to cancel the interference by the adjacent data symbol.

3. A pilot signal generating method, comprising:
   generating a symbol sequence including at least one data symbol;

determining a position of a pilot symbol which is inserted in the symbol sequence;

estimating a changed amount of a pilot symbol due to interference of a data symbol which is adjacent to a predefined position of the pilot symbol;

generating the pilot symbol in consideration of the estimated changed amount;

generating a transmitting symbol by inserting the pilot symbol in the symbol sequence; and generating, using a faster than Nyquist (FTN) scheme, a transmitting signal using the transmitting symbol, wherein estimating the changed amount of the pilot symbol estimates the changed amount due to the interference of the adjacent data symbol in consideration of the number of adjacent data symbols, and wherein estimating the changed amount of the pilot symbol estimates the changed amount of the pilot symbol using a sum of changed amounts of the adjacent data symbols corresponding to the number of the adjacent data symbols.

4. A transmitting apparatus, comprising:

a symbol sequence generating unit which generates a symbol sequence including at least one data symbol;

a pilot symbol position determining unit which determines a position of a pilot symbol which is inserted in the symbol sequence;

a changed amount estimating unit which estimates a changed amount of the pilot symbol due to interference of a data symbol which is adjacent to a predefined position of the pilot symbol;

a pilot symbol generating unit which generates the pilot symbol in consideration of the estimated changed amount; and a transmitting signal generating unit which generates a transmitting symbol by inserting the pilot symbol in the symbol sequence and generates a transmitting signal using the transmitting symbol, wherein the transmitting signal generating unit generates the transmitting signal using a faster than Nyquist (FTN) scheme, wherein the changed amount estimating unit estimates the changed amount due to the interference of the adjacent data symbol in consideration of the number of adjacent data symbols, and wherein the changed amount estimating unit estimates the changed amount of the pilot symbol using a sum of changed amounts of the adjacent data symbols corresponding to the number of the adjacent data symbols.

5. The transmitting apparatus of claim 4, wherein the symbol sequence generating unit generates the symbol sequence by mapping a bit string to the data symbol.

6. The transmitting apparatus of claim 4, wherein the pilot symbol position determining unit determines a position of the pilot symbol in accordance with a predefined rule.

7. The transmitting apparatus of claim 4, wherein the pilot symbol generating unit generates a pilot symbol which is distorted as much as the estimated changed amount so as to cancel the interference by the adjacent data symbol.

8. The transmitting apparatus of claim 4, further comprising:

a frequency converting unit which up-converts a frequency of the transmitting signal.

* * * * *